United States Patent [19]

Hanson

[11] 4,018,417
[45] Apr. 19, 1977

[54] VALVE AND SEAL ASSEMBLY THEREFOR

[75] Inventor: Herbert G. Hanson, Arlington Heights, Ill.

[73] Assignee: Vapor Corporation, Chicago, Ill.

[22] Filed: Nov. 24, 1975

[21] Appl. No.: 634,423

Related U.S. Application Data

[63] Continuation of Ser. No. 485,901, July 5, 1974, abandoned.

[52] U.S. Cl. .............................. 251/63.5; 251/144; 277/27; 277/75; 308/36.1; 308/72; 308/238
[51] Int. Cl.² ...................................... F16K 31/163
[58] Field of Search ............ 251/62, 63, 63.4, 63.5, 251/63.6, 144; 277/3, 27, 70, 75; 308/31.6, 72, 327 R

[56] References Cited

UNITED STATES PATENTS

| | | | |
|---|---|---|---|
| 2,321,927 | 6/1943 | McCoy et al. | 277/70 |
| 2,751,235 | 6/1956 | Watts et al. | 277/70 |
| 2,754,136 | 7/1956 | Phillips | 277/70 |
| 2,928,685 | 3/1960 | Tracy | 277/3 |
| 3,388,719 | 6/1968 | MaGinnis | 251/144 |
| 3,392,956 | 7/1968 | DeFrees | 251/144 |
| 3,599,931 | 8/1971 | Hanson | 251/63.5 |
| 3,823,950 | 7/1974 | Pedersen | 277/70 |

OTHER PUBLICATIONS

"The Aerospace Fluid Component Designer's Handbook," Technical Documentary Report No. RPL-T-DR-64-25, by Air Force Rocket Propulsion Lab., pp. 12.3.1-2, 12.3.2-1.

Primary Examiner—Martin P. Schwadron
Assistant Examiner—G. L. Walton
Attorney, Agent, or Firm—Francis J. Lidd

[57] ABSTRACT

An internal safety shutoff and operating valve includes a housing defining a valve seat and a cylinder. A piston slidable in the cylinder includes a valve closure member engageable with the seat for closing the valve. A spring biases the piston toward the closed position, and an actuating assembly moves the piston against the spring to the open position. One set of main ports communicates with the valve seat between the valve seat and the cylinder, and the other set of main ports communicates with the opposite side of the valve seat. Pressure forces on the piston are balanced by a passage in the piston intercommunicating the cylinder with one set of main ports. In order to prevent leakage between the piston and the cylinder wall to the other set of ports, a seal assembly including a groove in the piston wall and a seal ring in the groove is provided. The groove includes rounded inner corners, and the seal ring is provided with inner and outer grooves interconnected by passageways. When the seal assembly is subjected to a pressure differential, the grooves and passageways equalize the pressures on both sides of the seal, and the seal is moved axially in the direction of the pressure drop against a rounded corner. The rounded corner cams the seal radially against the cylinder wall to provide position sealing with the wall of the groove and with the wall of the cylinder.

9 Claims, 3 Drawing Figures

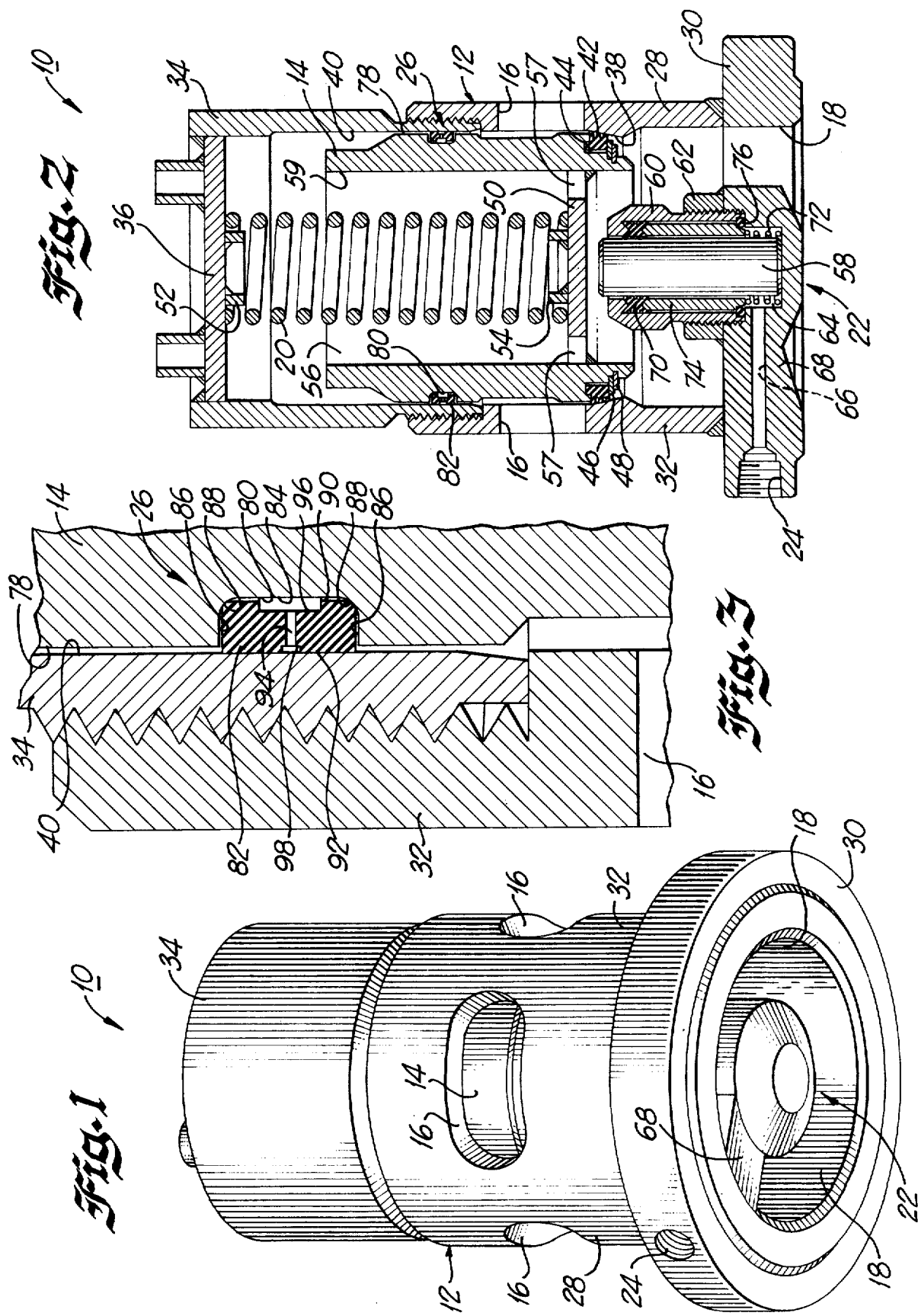

VALVE AND SEAL ASSEMBLY THEREFOR

This is a x continuation of application Ser. No. 485,901, filed July 5, 1974, now abandoned.

The present invention relates to valves of the type known as internal safety shutoff and operating valves, and to an improved seal assembly useful in such valves.

Internal safety shutoff and operating valves are used to control the flow of gases such as liguified petroleum gas, anhydrous ammonia, and similar products. In a typical installation, the valve may be mounted within a tank to control the flow of gas between the tank and a product line. Similarly, the valve may be installed within the product line to control flow therethrough.

For safety reasons, such valves are of the normally closed type and are maintained in the closed condition by a spring until operated, as by an external pressure control signal, to the open position. It is desirable that valves of this nature be capable of operation over a wide range of temperatures, and that their safe and reliable operation not be adversely affected by wear. It is also desirable that the valve function consistently and properly when subjected to pressure differences in either direction.

An example of a known internal safety shutoff and operating valve may be found in U.S. Pat. No. 3,599,931 of Herbert G, Hanson. As described in that patent, this known valve includes a piston assembly movable in a cylinder for opening and closing the valve, and the pressure forces acting on the piston are balanced by intercommunicating one of the valve ports with the cylinder through the piston assembly. Consequently, the piston assembly includes a seal for preventing leakage between the cylinder and the other main port.

Although the valve described in U.S. No. 3,599,931 has performed in a satisfactory manner for its intended purposes, it is subject to the difficulties of complexity and expense, particularly as regards the piston assembly and the seal arrangement between the piston and the cylinder. That device utilizes a spring loaded seal ring requiring springs, retainers, an adapter ring and retainer nuts. Not only is the arrangement complex, but also the force required to move the piston in the cylinder to open the valve is unduly large due to the spring loading of the seal.

Among the important objects of the present invention are to provide an internal safety shutoff and operating valve characterized by consistent, reliable and safe operation over a wide range of temperature and pressure conditions; to provide a valve of simplified and economical construction; to provide an improved seal assembly for preventing leakage between the piston and the cylinder of such a valve; and to provide a novel bidirectional pressure compensated seal assembly.

In brief, the above and other objects of the present invention are achieved by providing a valve including a housing defining a generally cylindrical chamber closed at one end and including a piston member mounted for reciprocal movement in the cylindrical chamber. A valve seat defined in the housing is engaged to close the valve by valve closure means carried on the piston member. A spring urges the piston member out of the cylinder and toward the valve seat to maintain the valve in a normally closed condition. Actuating means engageable with the piston moves the piston into the cylindrical chamber for selectively opening the valve. A first main port in the housing between the valve seat and the cylindrical chamber communicates with one side of the valve seat, and a second main port in the housing communicates with the opposite side of the valve seat. The pressure forces acting on the piston are balanced by passage means in the piston intercommunicating the second main port and the cylindrical chamber.

In accordance with an important feature of the invention, there is provided a novel seal assembly for preventing flow between the piston member and the wall of the cylindrical chamber for isolating the cylindrical chamber from the first main port. The seal assembly includes a generally rectangular seal retention slot extending around the circumference of the piston and having rounded inner corners. A seal ring of resilient material is disposed in the slot and is engageable with the wall of the cylindrical chamber. Grooves are formed around the inner and outer surfaces of the seal ring, and passages extending through the seal ring equalize the pressure present in the grooves when the seal ring is subjected to a pressure differential in either direction. The force resulting from the pressure differential moves the seal ring in an axial direction against one of the inclined inner corners and as a result the seal ring is not only forced axially against a side wall of the retention groove, but also is both mechanically cammed and pressure biased in a radially outward direction firmly against the wall of the cylindrical chamber.

The invention together with the above and other objects and advantages may be best understood from consideration of the embodiment of the invention illustrated in the accompanying drawing, wherein:

FIG. 1 is a perspective view of an internal safety shutoff and operating valve constructed in accordance with the principles of the present invention;

FIG. 2 is an axial sectional view of the valve of FIG. 1; and

FIG. 3 is an enlarged fragmentary sectional view illustrating the seal assembly incorporated in the valve of FIG. 1 and constructed in accordance with the present invention.

Having reference now to the drawing, in FIGS. 1 and 2 there is illustrated an internal safety shutoff and operating valve constructed in accordance with the principles of the present invention and designated as a whole by the reference numeral 10. In general, the valve 10 includes a housing assembly generally designated as 12 within which there is movably mounted a piston 14 for opening and closing a main flow path between a first group of main ports 16 and a second group of main ports 18. The valve is held in a normally closed position by the operation of a closure spring 20 and is actuated to an open position by the application of pressure from a control source to an actuating assembly 22 by way of a control port 24.

In use, the valve is mounted in a tank or a line in a system for the handling of gases such as liquified petroleum gas, anhydrous ammonia, or the like. The valve 10 therefore must be able to control the flow of gases in either direction between the ports 16 and 18, to operate under a wide range of temperatures such as, for example, 150° to −50° F., and to function reliably and safely when mounted in any orientation. In accordance with an important feature of the invention, the valve 10 is provided with a novel seal assembly generally designated as 26 greatly enhancing the operating characteristics of the valve while making it much simpler and more economical in construction than valves of this class known in the past.

Proceeding now to a more detailed description of the construction and operation of the valve 10, the housing 12 includes a base 28 composed of a generally circular flange 30 from which extends a generally cylindrical barrel portion 32. The housing is completed by threading into the barrel portion 32 a cylinder member 34 having a closed end wall 36. A conical valve seat 38 is formed in the base 28 on the inner wall of barrel portion 32 between the main ports 16 and 18. Ports 16 are directed radially outward of the valve and are spaced around the circumference of the barrel portion 32. Ports 18 extend axially from the interior of the barrel portion 32 through the flange 30.

In order to control the opening and closing of the valve 10, the piston 14 is slidable telescopically within a machined cylindrical wall 40 defined on the interior of the cylinder member 34. The piston carries at its lower end, as illustrated in the drawing, a valve closure assembly including a flexible resilient valve ring 42 held in a slot 44 in the piston by means of a washer 46 and retaining ring 48. The valve ring 42 is constructed in the manner described in above mentioned U.S. Pat. No. 3,599,931, to which reference may be had for a further description beyond that necessary to an understanding of the present invention.

As indicated above, closure spring 20 maintains the valve 10 in a normally closed position to provide fail safe operation in accordance with which the valve can be opened only in response to operation of the actuating assembly 22. Spring 20 comprises a coil spring held in compression between the cylinder member end wall 36 and a transverse plate member 50 carried by the piston 14. Spring retaining projections 52 and 54 are mounted on the wall 36 and plate 50 for assuring that the closure spring 20 is held in a central axial position.

In order to minimize the actuating forces necessary to open the valve, the piston 14 is subjected to balanced pressure forces through the provision of a pressure communication passage 56 extending through the piston 14 between the main ports 18 and the interior of the cylinder member 34. In the illustrated arrangement, the piston 14 is in the form of an elongated hollow member, and passage 56 is defined in large part by an internal wall 59 of the piston 14. Flow through the plate 50 is permitted by the provision of a plurality of apertures 57 surrounding the closure spring 20 and a spring retainer 54.

Since the order to balance pressure forces acting on the piston 14 the interior of cylinder member 34 is intercommunicated with main ports 18, it is necessary to prevent leakage or flow between the interior of the cylinder member 34 and the main ports 16. As described in greater detail below, this leakage is prevented in accordance with the invention by the provision of the seal assembly 26.

Actuating assembly 22 selectively moves the piston 14 against the force of closure spring 20 for operating the valve 10. Actuating assembly 22 includes a plunger 58 slidably mounted within a bonnet 60 attached by threading into a boss 62 disposed at the center of the circular flange 30. A control chamber 64 is defined within the base 28 and communicates with control port 24 by means of a passage 66 extending through a web 68 separating the ports 18 from one another. Control chamber 64 is isolated from the interior of valve 10 by means of a seal ring 70 through which plunger 58 is slidable. Seal 70 is loaded by means of a loading spring 72 acting through a slidable adapter sleeve 74. A gasket 76 is provided to prevent leakage around the bonnet 60.

As compared with internal safety shutoff and operating valves used in the past, such as that disclosed in above mentioned U.S. Pat. No. 3,599,931, the valve 10 of the present invention is substantially simpler in construction, requires less actuating force to operate, and is more reliable in operation over a wide range of temperatures. These important advantages are obtained through the provision of the novel seal assembly 26 best illustrated in FIG. 3.

With reference to FIG. 3, it can be seen that the piston 14 includes an annular piston wall 78 telescopically moveable in, and slightly spaced inwardly from, cylindrical wall 40 of the cylinder member 34. In general, the seal assembly 26 includes a seal retention groove 80 formed in the piston wall 78 together with a seal ring 82 mounted in the groove. In accordance with the invention the ring 82 and groove 80 cooperate when subjected to a pressure differential in either direction to provide a positive seal preventing flow between the walls 40 and 78 over a wide range of temperatures and without necessitating large initial actuating forces.

Groove 80 is generally rectangular in cross sectional configuration, and includes a base wall 84 and side walls 86, these walls being jointed by inclined, curving corner walls 88. The seal ring 82 is formed of a flexible, resilient, elastomeric material capable of deformation under pressure. A preferred material is Teflon, such as a glass filled Teflon, but other materials may be utilized if desired.

In general configuration, the seal ring 82 is also generally rectangular in cross section and is roughly complementary in shape to the cross section of the groove 80. The ring is annular, continuous throughout its length, and has roughly a uniform cross section throughout its length. When mounted in the valve 10, the ring has an axial thickness slightly smaller than the distance between side walls 86 of the groove 80 and has a radial thickness, defined between inner and outer seal ring surfaces 90 and 92, slightly smaller than the distance between the base wall 84 of the groove 80 and the cylinder wall 40.

Prior to mounting of the ring 82 in the grooove 80, preferably each of the four corners of the rectangular cross section of the ring is substantially a right angle corner. The ring is preferably initially formed, as by molding, with an outer diameter somewhat larger than the diameter of the cylindrical wall 40 so as after assembly to provide an initial sealing bias against wall 40. Preferably the ring 82 is mounted in the groove 80 by initially heating the ring to increase its pliability, by sliding the ring over the surface of the wall 78 to the groove 80, and by cold forming the ring and radially compressing it inwardly into the groove 80.

As a result of this cold forming operation, and as can be seen in FIG. 3, the inner corners of the ring are crushed by cold forming against the corner walls 88 of the groove 80. This tends to assure engagement between the ring 82 and the corner walls 88 and between the surface 92 and the cylinder wall 40.

In accordance with an important feature of the invention, positive sealing is effected by the provision of pressure equalization passages 94 extending radially through the ring 82 between inner and outer grooves 96 and 98 formed respectively in the inner and outer surfaces 90 and 92 of the ring 82. This arrangement of passages 94 in grooves 96 and 98 functions when the ring is subjected to a pressure differential from either direction to apply the pressure differential to the low pressure side of the ring thereby to force the ring against the corner walls 88. As a result, the ring 82 is positively sealed against the low pressure groove side wall 86 and against the cylinder wall 40.

More specifically, both the grooves 96 and 98 are continuous around the full circumferential length of the ring 82. Passages 94 are sufficient in number to assure that the pressure is equalized between grooves 96 and 98. When the seal assembly 26 is subjected to a pressure differential, as by closing of the valve 10, pressure leakage begins to occur between the high pressure and low pressure sides of the seal assembly. Depending upon such factors as temperature, surface conditions of the adjacent walls, and the like, this leakage may be either over the inner surface 90 or the outer surface 92 of the seal ring or both. This leakage pressurizes the entire system of passages 94 and grooves 96 and 98. As a result, the pressure differential is applied to that half of the seal ring located at the low pressure side. The seal ring is displaced axially toward one side wall 86 and one corner wall 88. This provides a first seal between the ring 82 and the side wall 86. In addition, the inclination of the corner wall 88 provides a mechanical camming action tending radially to expand the seal against the cylinder wall 40. As this camming action continues, pressure is freely communicated over the inner surface 90 of the seal resulting in additional pressure biasing of the seal 82 outwardly against the cylinder wall 40.

It should be noted that the inner groove 96 is significantly wider than the outer grooves 98. It is believed that this area differential may provide an additional outward pressure biasing force in the operation of the seal ring 82.

Additionally, the wider inner groove 96 also provides means to facilitate assembly. As developed, the configuration provides proper flexibility for the seal ring's 82 elastometric material so that the seal 82 can slide effectively over the piston wall 78.

Since the seal assembly 26 is actuated by pressure differential existing thereacross, rather than by spring loading or other constant mechanical means, the force required initially to open the valve - the breaking force - is minimized. This is highly desirable in valves of this nature and particularly in installations where plural valves are operated from a single control pressure source. In addition, the pressure actuation of the valve seal is highly reliable over a wide temperature range wherein the ring 82 may experience thermal expansion or contraction widely differing from those of the piston 14 and cylinder member 34. Moreover, the arrangement compensates for wear of the seal ring 82 and for imperfections in the matching of the cylinder wall 40, and is not rendered ineffectively by dirt and foreign materials which may be present in the gas in which the valve 10 is used.

Because the seal assembly 26 consists simply of the groove 80 and ring 82 an extremely simple valve construction is possible. The piston 14 is a simply machined and fabricated part requiring minimum assembly steps. In addition, if the valve 10 is mounted horizontally or in some other non-vertical orientation, the ring 82 performs a desirable spacing or wiping function preventing metal to metal contact between the piston 14 and the cylinder member 34.

Although in the illustrated arragement, the grooves 80 is formed in the piston 14, it should be understood that if desired, the seal assembly 26 could be associated with the wall 40 of the cylinder member 34 rather than with the piston 14. While the invention has been described with reference to details of the illustrated embodiment, such details are not intended to limit the invention as defined in the following claims.

What is claimed and desired to be secured by Letters Patent of the United States is:

1. In an internal safety shutoff and operating valve including a housing defining a cylinder having fluid inlet and outlet means, a piston assembly movable in said cylinder comprising a generally cylindrical rigid body having a central axial opening extending throughout its length for balancing pressures acting on the piston assembly, a first groove adjacent an end of said body, valve closure means including a valve seal member mounted in said first groove, valve actuating means for operating said valve to control fluid flow through said inlet and outlet means, a circular cylindrical wall formed on the exterior of said body spaced from said first groove and sized to move with clearance in said cylinder, a seal retention groove extending around said cylindrical wall and having a generally rectangular shape with rounded interior corners, and a plastic seal ring in said groove for sealingly engaging said cylindrical wall, said seal ring including first and second grooves extending respectively around the inner and outer surfaces of said seal ring and passage means intercommunicating said first and second grooves, said seal ring of a configuration including corners substantially of a right angle whereby said seal corners interact with said rounded interior corners to provide a mechanical camming of said seal relative to said groove.

2. The piston assembly of claim 1, said passage means comprising at least one passageway extending in a radial direction through said seal ring.

3. The piston assembly of claim 1, said first groove having a larger area than said second groove.

4. The piston assembly of claim 1, a spring retention member mounted adjacent said one end of said body in said central axial opening, and flow apertures formed in said retention member.

5. A seal assembly for sealing between first and second telescoping cylindrical members, said seal assembly comprising:
an annular chamber formed in the first cylindrical member and open at one side to the second cylindrical member;
said chamber being of a generally rectangular cross sectional configuration and having a back wall generally parallel to and spaced from the second cylindrical member, and having spaced side walls extending from said back wall toward said open side;
a cam surface in said chamber adjacent the intersection of said back wall and one said side wall;
a seal ring mounted in said chamber, said seal ring comprising a continuous annular body of plastic material having an inner surface overlying said chamber back wall, side surfaces overlying said chamber side walls, and an outer surface engageable with said second cylindrical wall;

the corner of said inner seal surface and another of said surface of said seal being engageable with said cam surface to interact to provide rotation of said seal ring in said chamber;

first and second grooves extending continuously around the inner and outer seal surfaces;

said first and second grooves defining first and second planar surfaces, respectively;

and passage means in said seal between said first and second grooves.

6. The assembly of claim 15, said cam surface comprising a rounded corner joining said back wall and said one side wall.

7. In an internal safety shutoff and operating valve including a housing defining a cylinder having fluid inlet and outlet means, a piston assembly movable in said cylinder comprising a generally cylindrical rigid body having a central axial opening extending throughout its length for balancing pressures acting on the piston assembly, a first groove adjacent an end of said body, valve closure means including a valve seal member mounted in said first groove, valve actuating means for operating said valve to control fluid flow through said inlet and outlet means, a circular cylindrical wall formed on the exterior of said body spaced from said first groove and sized to move with clearance in said cylinder, a seal retention groove extending around said cylindrical wall and having a generally rectangular shape with rounded interior corners, and a plastic seal ring in said groove for sealingly engaging said cylindrical wall, said seal ring of a configuration including corners substantially of a right angle whereby said seal corners interact with said rounded interior corners to provide a mechanical camming of said seal relative to said groove, said seal ring further including first and second grooves defining pressure surfaces extending respectively around the inner and outer surfaces of said seal ring and passage means intercommunicating said first and second grooves, said first groove having a larger pressure surface area than said second groove.

8. The piston assembly of claim 7, said passage means comprising at least one passageway extending in a radial direction through said seal ring.

9. The piston assembly of claim 7, a spring retention member mounted adjacent said one end of said body in said central axial opening, and flow apertures formed in said retention member.

* * * * *